US005481637A

United States Patent [19]
Whitehead

[11] Patent Number: 5,481,637
[45] Date of Patent: Jan. 2, 1996

[54] HOLLOW LIGHT GUIDE FOR DIFFUSE LIGHT

[75] Inventor: Lorne A. Whitehead, Vancouver, Canada

[73] Assignee: The University of British Columbia, Vancouver, Canada

[21] Appl. No.: 333,340

[22] Filed: Nov. 2, 1994

[51] Int. Cl.$^6$ .................................. G02B 6/20; F21V 7/04
[52] U.S. Cl. .......................... 385/125; 385/36; 385/37; 385/146; 385/147; 385/901; 362/32; 362/29; 362/339; 362/340
[58] Field of Search ................................ 385/36, 37, 125, 385/133, 146, 147, 901; 362/29, 32, 333, 337, 339, 340

[56] References Cited

U.S. PATENT DOCUMENTS

| | | | |
|---|---|---|---|
| 4,260,220 | 4/1981 | Whitehead | 385/147 X |
| 4,750,798 | 6/1988 | Whitehead | 385/147 X |
| 4,787,708 | 11/1988 | Whitehead | 385/147 X |
| 4,799,136 | 1/1989 | Molnar | 362/300 |
| 4,805,984 | 2/1989 | Cobb, Jr. | 362/339 |
| 4,834,495 | 5/1989 | Whitehead et al. | 385/147 X |
| 4,850,665 | 7/1989 | Whitehead | 385/147 X |
| 4,939,627 | 7/1990 | Herst et al. | 362/299 |
| 4,941,074 | 7/1990 | DeCosse et al. | 362/61 |
| 4,952,023 | 8/1990 | Bradshaw et al. | 385/147 X |
| 4,969,075 | 11/1990 | Helm et al. | 362/330 |
| 4,984,144 | 1/1991 | Cobb, Jr. et al. | 362/339 |
| 4,989,933 | 2/1991 | Duguay et al. | 385/147 X |
| 5,016,143 | 5/1991 | Aikens | 362/32 |
| 5,051,878 | 9/1991 | Ngai | 362/299 |
| 5,054,885 | 10/1991 | Melby | 359/618 |
| 5,083,252 | 1/1992 | McGuire | 362/293 |
| 5,115,380 | 5/1992 | Huisingh et al. | 362/33 |
| 5,190,370 | 3/1993 | Miller et al. | 362/340 |
| 5,195,818 | 3/1993 | Simmons et al. | 362/224 |
| 5,202,950 | 4/1993 | Arego et al. | 385/146 |
| 5,207,493 | 5/1993 | Murase et al. | 362/31 |
| 5,207,495 | 5/1993 | Ahlstone | 362/33 |
| 5,207,498 | 5/1993 | Lawrence et al. | 362/91 |
| 5,219,217 | 6/1993 | Aikens | 362/32 |
| 5,224,770 | 7/1993 | Simmons et al. | 362/29 |
| 5,233,679 | 8/1993 | Oyama | 385/146 |
| 5,237,641 | 8/1993 | Jacobson et al. | 385/146 |
| 5,339,382 | 8/1994 | Whitehead | 395/146 |
| 5,363,470 | 11/1994 | Wortman | 385/147 |

*Primary Examiner*—Brian Healy
*Attorney, Agent, or Firm*—Oyen Wiggs Green & Mutala

[57] ABSTRACT

An outer prism light guide surrounds a cover which in turn surrounds a light source. The outer guide is formed of prism light guide wall material having uniform shape in cross-sections perpendicular to a first octature symmetry direction, with its optical center line parallel to the first octature symmetry direction. Surfaces of the wall material are substantially in octature relative to the first octature symmetry direction. A surface normal vector at any point on any internal surface of the material is either substantially parallel or substantially perpendicular to a first notional line extending from the point through and perpendicular to the optical center line. The cover has cylindrical symmetry about the optical center line to intercept a substantial portion of light emitted by the source. The cover is formed of prism light guide wall material, with surfaces of the cover wall material substantially in octature at any point on the cover relative to a second, spatially variable octature symmetry direction, which, at the point, is perpendicular to the first octature symmetry direction; and, perpendicular to a second notional line extending from the cover point through and perpendicular to the optical center line. A surface normal vector at any point on any outer surface of the cover is either substantially parallel or substantially perpendicular to the first octature symmetry direction. The cover is confined to a region sufficiently close to the optical center line to substantially prevent propagation of light rays incident on an inside surface of the cover to and through the light guide wall material.

6 Claims, 12 Drawing Sheets

HOLLOW LIGHT GUIDE FOR DIFFUSE LIGHT

FIELD OF THE INVENTION

This invention allows the light output of a large diffuse light source to be coupled into a prism light guide such that most of the light is confined in and guided along the guide, with only insignificant amounts of light escaping from the guide in the vicinity of the light source.

BACKGROUND OF THE INVENTION

Light guides can be divided into two basic categories. The first, and best known, is solid light guides whose cross-sectional area is composed entirely of a guidance medium. Optical fibres, and larger analogous structures, are of this type. They achieve high efficiency because light is guided by total internal reflection, a non-absorptive process.

The second major category is hollow light guides, which can be more practical because they can guide more light using less material. For example, hollow metallic light guides confine and guide light by means of metallic reflection, which is an absorptive process. More recently, prism light guides have been used to confine and guide light. These are hollow structures which achieve total internal reflection by means of careful arrangement of prismatic surfaces on the exterior of the prism light guide's transparent dielectric wall material. Although prism light guides are more efficient than metallic light guides, they suffer from a serious drawback: they are only able to guide light which falls within a limited range of angles relative to the prismatic surfaces.

It is often possible to collimate the light output of a small light source with a reflector so that essentially all of the reflected light rays satisfy the angular relationship necessary to ensure that essentially all such rays undergo total internal reflection as they propagate along the light guide. But, there are some situations where this is difficult; for example, if the light output of a large diffuse light source is to be coupled into a prism light guide.

In residential lighting applications, for example, it is desirable to couple the light output of comparatively large compact florescent lamps into comparatively small prism light guides; and, in commercial lighting applications, it is desirable to couple light output from radio frequency induction florescent lamps into somewhat larger light guides. In these cases the diffuse light source is too large to allow sufficient collimation by a reflector to ensure that all of the reflected light rays satisfy the angular relationship aforesaid so as to ensure that essentially all such rays undergo total internal reflection as they propagate along the light guide. Consequently, a substantial portion of the light rays emitted by the diffuse light source escape immediately from the light guide in the vicinity of the light source, creating undesirable brightness in that vicinity, and reducing the intensity of the light which remains to be guided along the full extent of the light guide.

The present invention provides a means for coupling the light output of a relatively large diffuse light source into a relatively smaller prism light guide such that most of the light is confined within and guided along the light guide, with only insignificant amounts of light escaping from the guide in the vicinity of the light source.

SUMMARY OF THE INVENTION

In accordance with the preferred embodiment, the invention provides a light guide containing a light source. The light guide consists of an outer prism light guide surrounding a cover which in turn surrounds the light source. The outer prism light guide is formed of prism light guide wall material having uniform shape in cross-sections perpendicular to a first octature symmetry direction, and having an optical centre line parallel to the first octature symmetry direction. Surfaces of the light guide wall material are substantially in octature relative to the first octature symmetry direction; and, a surface normal vector at any point on any internal surface of the material is either substantially parallel or substantially perpendicular to a first notional line extending from the point through and perpendicular to the optical centre line. The cover is positioned within the guide, around the light source, in cylindrical symmetry about the optical centre line, to intercept a substantial portion of light emitted by the source. The cover is formed of prism light guide wall material, with surfaces of the cover wall material substantially in octature at any point on the cover relative to a second, spatially variable octature symmetry direction, which, at the point, is perpendicular to the first octature symmetry direction; and, perpendicular to a second notional line extending from the point on the cover through and perpendicular to the optical centre line. A surface normal vector at any point on any outer surface of the cover is either substantially parallel or substantially perpendicular to the first octature symmetry direction. The cover is confined to a region sufficiently close to the optical centre line to substantially prevent propagation of light rays incident on an inside surface of the cover to and through the light guide wall material.

Advantageously, the cover forms a cylinder of length "1" and diameter "d", with "1" being less than the light guide's length dimension and with each end of the cylinder extending more than 1.65 times the diameter "d" beyond the light source.

The light guide may also form a cylinder. For example, the light guide and the cover may form partial concentric cylinders truncated by a planar metallic reflector which intersects the optical centre line.

A light extraction mechanism may be provided to controllably emit light at selected points along the guide, with end reflector means being provided to prevent light emission through either opposed end of the guide.

DETAILED DESCRIPTION OF THE PREFERRED EMBODIMENT

Figure 1:
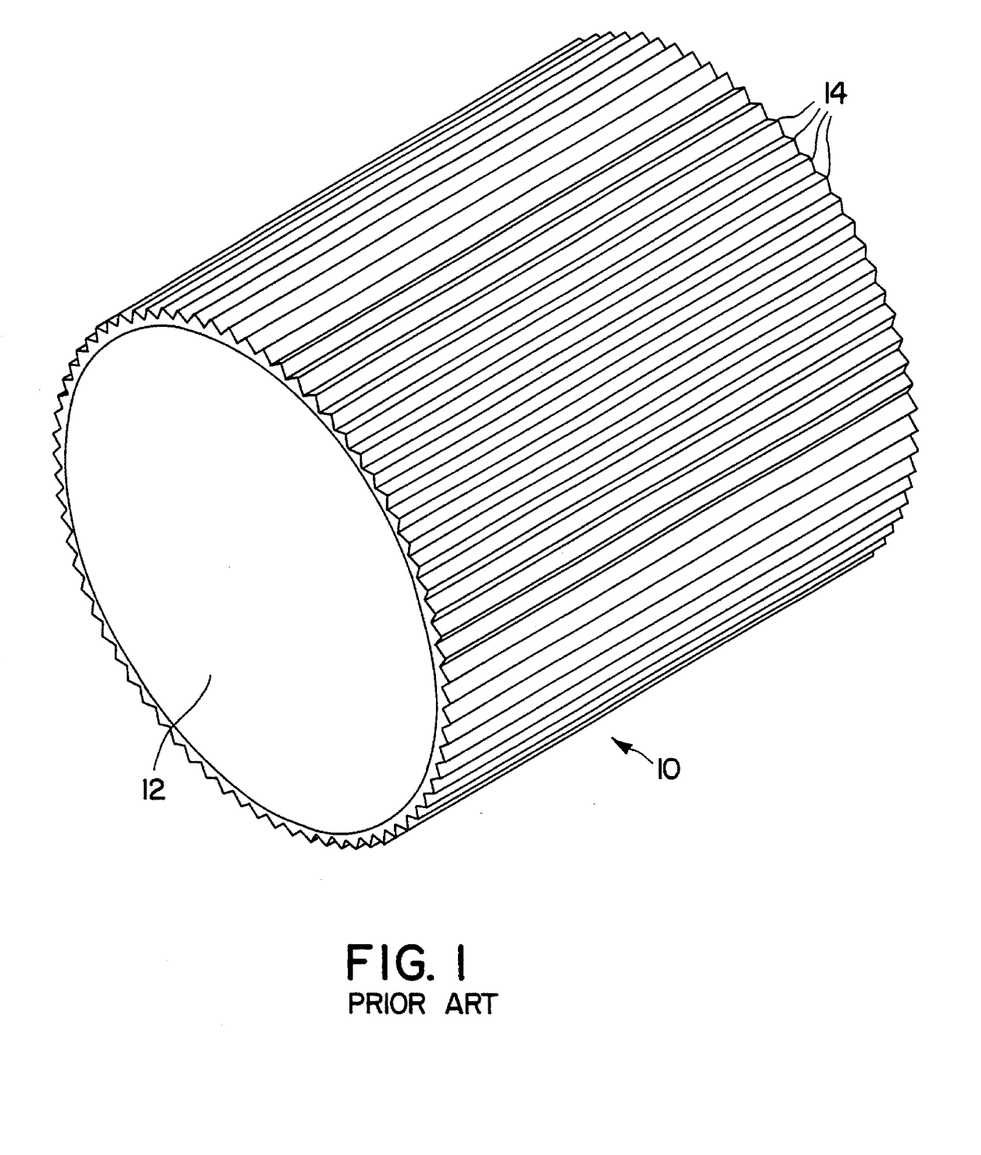
FIG. 1 is a pictorial illustration of a prior art prismatic light guide.

FIG. 1 depicts an exemplary prior art prismatic light guide 10, which happens to be of circular cross-section. The exterior, transparent dielectric wall material 12 of light guide 10 bears a plurality of prismatic surfaces 14. As indicated above, prism light guides are only able to guide light which falls within a limited range of angles relative to the prismatic surfaces. Such rays undergo "total internal reflection", meaning that they remain confined within the guide and propagate along the guide as they are repeatedly reflected by the prism light guide wall material.

For prism light guides, the direction of incidence of a given light ray relative to the prismatic wall material is what determines whether that ray will undergo total internal reflection. This can be described in terms of the angles $\theta$ and $\phi$ shown in FIG. 2, which depicts a segment 12' of transparent dielectric wall material bearing prismatic surfaces 14'. Segment 12' is perpendicularly intersected by a first notional plane $P_1$ parallel to prismatic surfaces 14' and by a second notional plane $P_2$ transverse to prismatic surfaces 14'. The light ray R defines a third notional plane $P_3$ which intersects plane $P_1$ at an angle $\phi$, with the ray R intersecting the perpendicular bisector of planes $P_1$, $P_2$ at an angle $\theta$. It can be shown that light rays will undergo total internal reflection for all values of $\phi$, provided that $\theta$ is less than a critical angle $\theta_c$ given by the following equation:
where $n$ is the refractive index of the material. For example, for a typical value of $n$ of 1.6 (for polycarbonate material), $\theta$ is approximately 30°.

Figure 3:
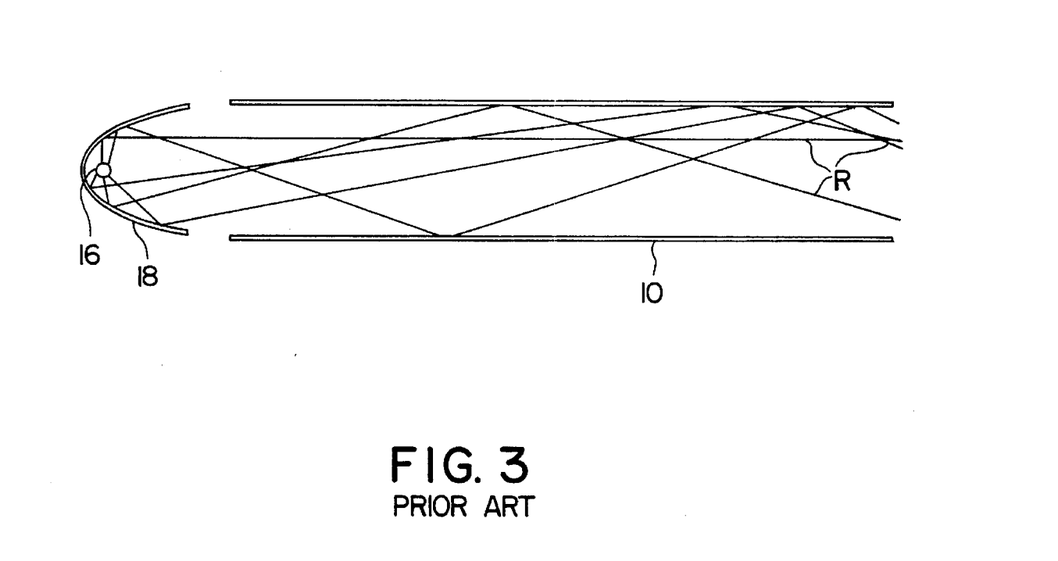
FIG. 3 is a cross-sectional elevation of a prismatic light guide having a well collimated light source.

As depicted in FIG. 3, it is often possible to collimate the light output of a small light source 16 with a reflector 18 so that essentially all of the reflected light rays R come within 30° of the axis direction of prism light guide 10, thus ensuring that essentially all such rays undergo total internal reflection as they propagate along guide 10.

Figure 4:
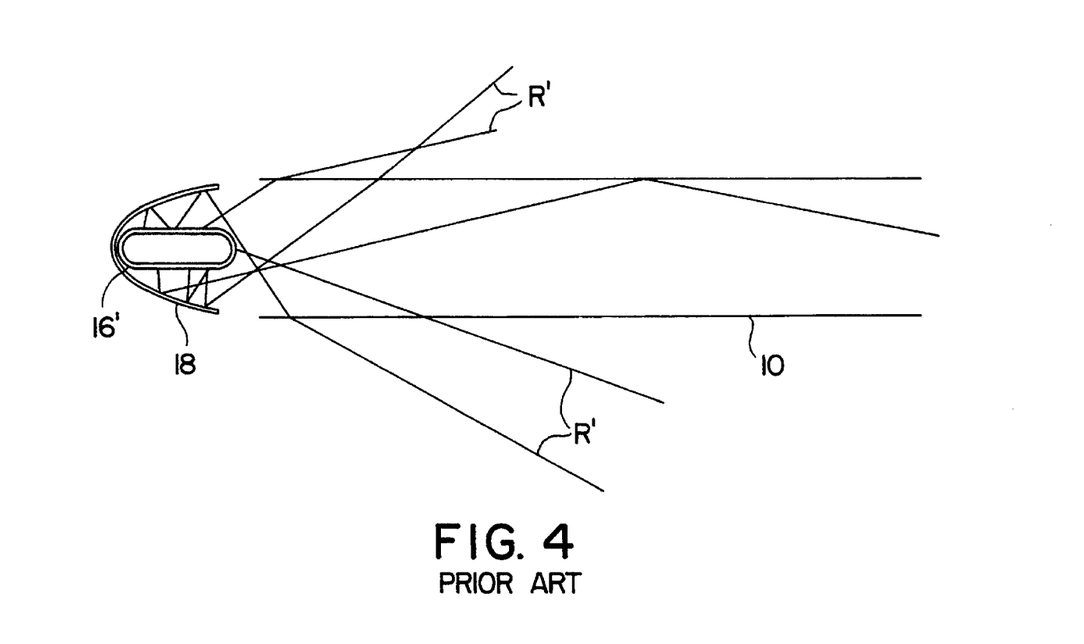
FIG. 4 illustrates the difficulty of coupling the light output of a comparatively large light source into a comparatively small prism light guide.

As shown in FIG. 4, it is difficult to couple the light output of a comparatively large light source 16' into a comparatively small prism light guide 10. Light source 16' is too large to allow sufficient collimation by reflector 18 to ensure that all of the reflected light rays R satisfy the constraint of equation (1) so as to ensure that essentially all such rays undergo total internal reflection as they propagate along guide 10. Consequently, a substantial portion of the light rays R' emitted by light source 16' escape immediately from guide 10 in the vicinity of source 16', creating undesirable brightness in that vicinity, and reducing the intensity of the light which remains to be guided along the full extent of guide 10.

Figure 5:
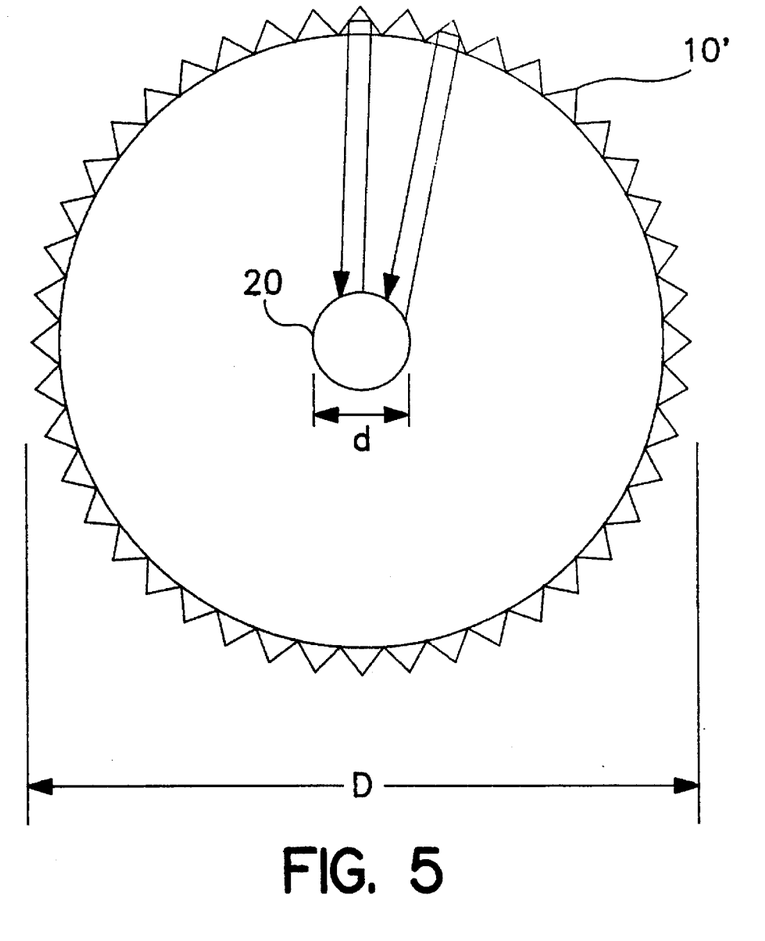
FIG. 5 is a cross-sectional end view of a prismatic light guide and illustrates a phenomenon whereby light rays originating from specific locations relative to the light guide are confined and guided along the light guide irrespective of their angle relative to the light guide's axis direction.

An important additional consideration is that in certain cases prism light guides can confine and guide light rays which come within any angle relative to the guide's axis direction, provided such rays originate from specific locations relative to such guides. FIG. 5 depicts an example of this phenomenon for a circular cross-sectioned prism light guide 10' containing a notional cylinder 20 having a diameter "d". It can be shown that, for prism light guide wall material having a refractive index of 1.6, all light rays passing through cylinder 20 are reflected by the prism light guide wall material as long as the diameter "d" of cylinder 20 is less than or equal to 17.6% of the diameter of the circular prism light guide. The reason this phenomenon holds true is that as long as light rays pass through cylinder 20, the value of $\phi$ as described above in relation to FIG. 2 will always be less than 10.1°, which ensures reflection for all values of $\theta$.

Thus, if a diffuse light source is located within cylinder 20, all light rays emitted by that source will be confined and guided by the prism light guide. Unfortunately, since the cross-sectional area of cylinder 20 represents only 3% of the cross-sectional area of guide 10', the foregoing phenomenon is of little practical advantage. Indeed, if a diffuse light source of that size were available, one could simply use a conventional reflector to efficiently collimate the light output of that source, as described above in relation to FIG. 3. Nevertheless, the phenomenon suggests that it may be possible to take advantage of the special angular characteristics of prism light guide wall material to achieve light guidance beyond the normal collimation restrictions.

Figure 6:
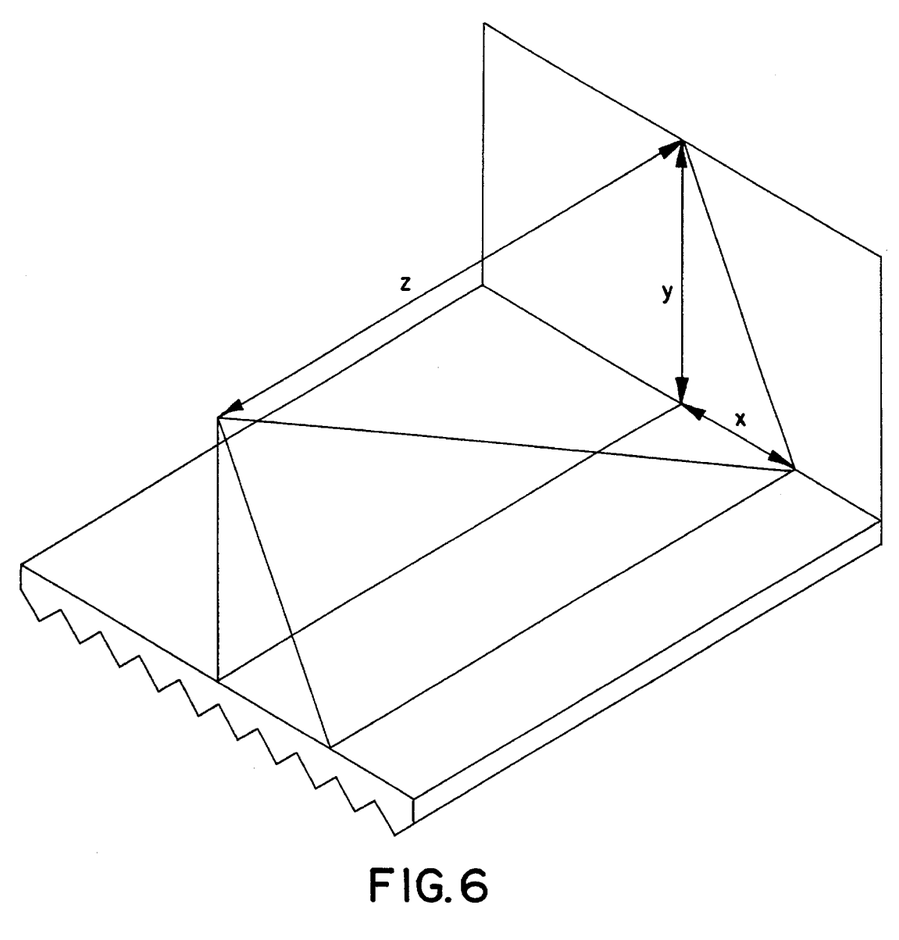
FIG. 6 is similar to FIG. 2, but utilizes a Cartesian coordinate system.

To understand this better, it is helpful to refer to FIG. 6, which provides a more useful depiction of the range of directions for which prism light guide wall material will create total internal reflection. FIG. 6 uses a different means of describing the direction of light incident on prism light guide material 12', which is better adapted to diagrammatical representation on a plane surface. FIG. 6 depicts the same geometry as FIG. 2, but using a Cartesian coordinate system. The incident ray R has a unit vector (x, y, z), and in this depiction the two dimensional description of direction which is helpful is x/y, which depicts the deviation of ray R from normal to the light guide wall, in a direction perpendicular to prisms 14'; and z/y, which depicts deviation from the perpendicular to the light guide wall in the direction parallel to prisms 14'.

Figure 7:
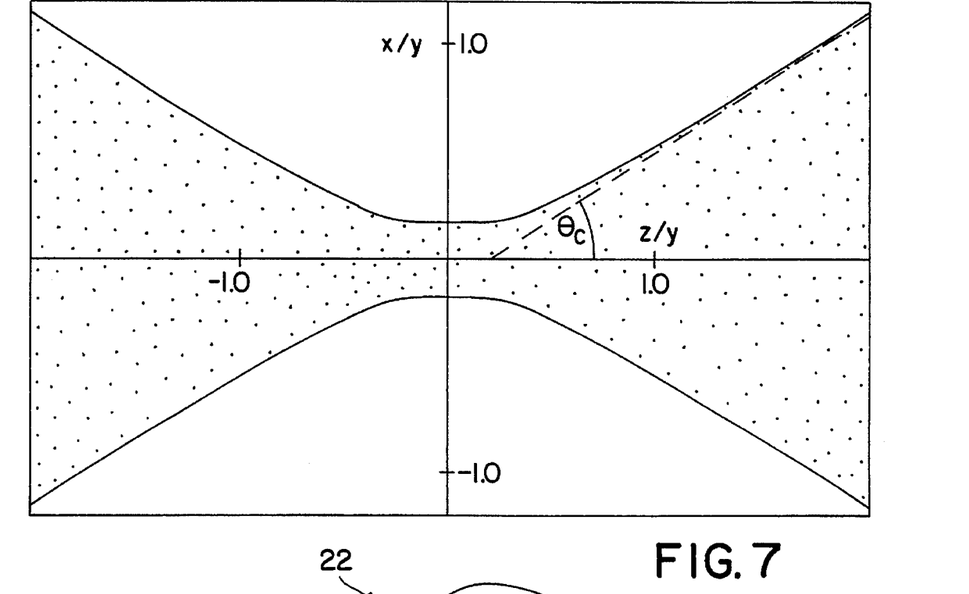
FIG. 7 is a graph which plots the range of angles for which prism light guide wall material produces total internal reflection using the Cartesian coordinates of FIG. 6.

The relationship between $\phi$, $\theta$, x/y and z/y is given by:

Using the FIG. 6 coordinate system, FIG. 7 plots the range of angles for which prism light guide wall material produces total internal reflection. One of the reasons that this depiction is helpful is that it is a projection onto a plane of precisely what one sees when one looks into a sheet of prism light guide wall material; that is, FIG. 7 shows the visual appearance of the zone of total internal reflection (shaded area) versus the zone of transmission (non-shaded area).

FIG. 7 illustrates three important features. First, when $z/y=0$ (i.e. when the ray is in the plane perpendicular to the axis of the light guide, that is when $\theta=90°$), it can be seen that the width of the total internal reflection zone is rather narrow (i.e. $x/y= \pm 0.179$, which is the value of $\tan \phi$, so $\phi=\pm 10.1°$). The second important feature is the asymptote where both z and x are much larger than y, in which case $x/z \approx \tan \theta_c$. The slope of this asymptote is 0.605, which corresponds to a value of $\theta_c=31.1°$, which is the maximum value of $\theta$ for which all values of $\phi$ result in reflection.

The present invention provides a non-absorptive means of preventing light rays emitted by a diffuse source from entering the non-total internal reflection (i.e. non-shaded) zone of FIG. 7. The invention in its simplest form (FIG. 8) consists of surrounding the diffuse source with a hollow transparent cylinder 22 having a smooth outer surface 24 and having an inner surface consisting of a large number of right angle prisms 26 which extend perpendicular to the axis of cylinder 22. Cylinder 22 can be made, for example, from the same prismatic sheet material used to form prism light guides, by orienting the prisms differently (i.e. in a light guide the prisms face outwardly and extend parallel to the guide's axial direction).

Figure 9:
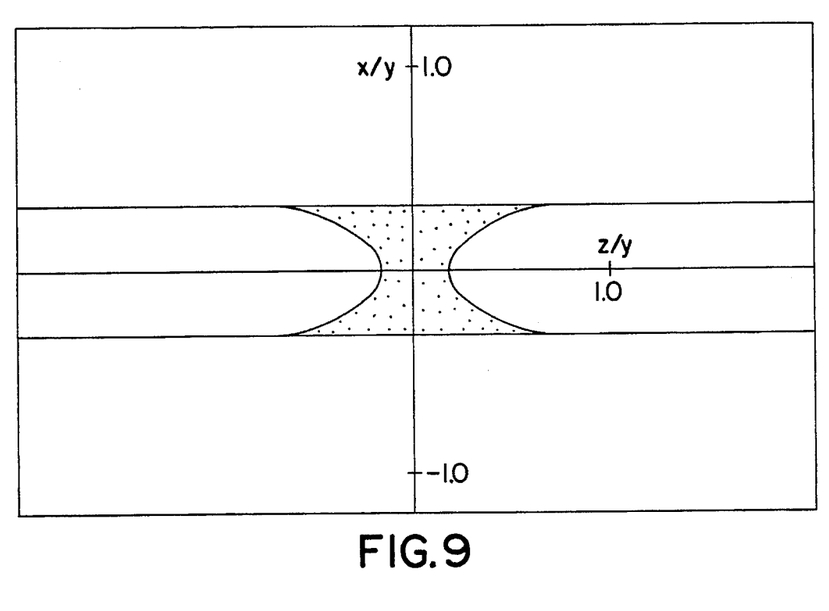
FIG. 9 is a graph which plots, in the Cartesian coordinates of FIG. 6, the appearance of a diffuse light source surrounded by the cylindrical structure of FIG. 8, when viewed from a distance from the cylinder's axis equal to 3.2 times the cylinder's radius.

As an illustrative example, consider the case where cylinder 22 surrounds a diffuse light source such as a florescent tube. FIG. 9 shows how such a source would appear when viewed from a distance from the cylinder's axis equal to 3.2 times the cylinder's radius (the reason for this choice of distance is clarified below). In a lengthy but straightforward calculation, the appearance shown can be calculated from the characteristics of prism light guide wall material. Looking at the centre of the cylinder, one perceives an opaque zone (shaded area in FIG. 9) of width $\pm 0.179$, which is the normal opaque zone at normal incidence of prism light guide wall material. The familiar shape of this total internal reflection zone is distorted by the curvature of the prism light guide wall material, into the shape shown. It is important to note that light rays which are not transmitted by the prism light guide wall material due to the prismatic covering, are reflected back toward the diffuse source, where they may be re-reflected randomly, so that they have a secondary opportunity to escape in allowed directions. Therefore, little light is lost by this prismatic covering, assuming that the source is not very absorptive, as is often the case. It is also important to note that providing that prism light guide wall material is of good optical quality, essentially no light is present in the total internal reflection zone of FIG. 9.

Figure 10:
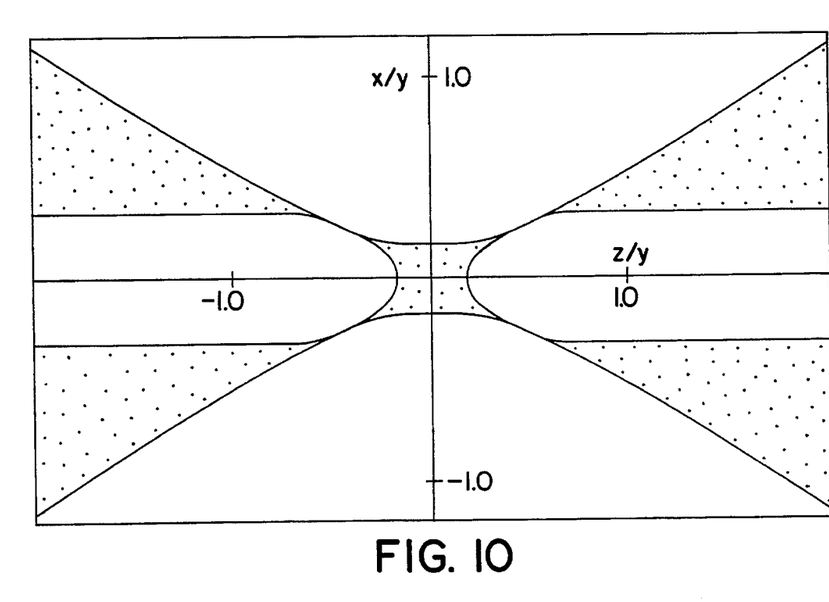
FIG. 10 shows the FIG. 9 light escape zone of the diffuse light source covered by the FIG. 8 structure, superimposed on the FIG. 7 depiction of the total internal reflection zone of prism light guide wall material.

The reason for the specific choice of viewing distance for FIG. 9 can now be explained in relation to FIG. 10. In FIG. 10, the light escape zone of the diffuse light source covered by the FIG. 8 structure as shown in FIG. 9, is superimposed on a depiction of the total internal reflection zone of prism light guide wall material shown in FIG. 7. As can be seen, none of the light rays escaping from the covering of the diffuse source lie outside the total internal reflection zone of the prism light guide itself, so they are all confined and guided. In the most common case where the refractive index of the prism light guide wall material is 1.6, this occurs for a diffuse cylinder having a diameter of 32% of the diameter of the prism light guide, which corresponds to an area of 10% of the cross-sectional area of the prism light guide itself. It should be noted that this is a 3.2-fold increase in the cross-sectional area, compared to that which would be possible without such a prismatic covering, and which allows a corresponding increase in the amount of light which can be carried by a light guide of a given size.

Figure 11:
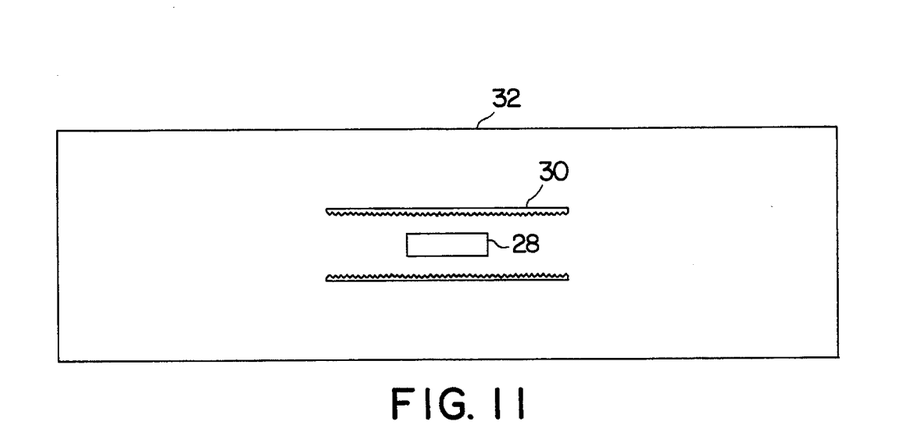
FIG. 11 is a cross-sectional elevation of a prism light guide having a diffuse light source surrounded by a cylindrical cover of the type shown in FIG. 8.

FIG. 11 shows how the foregoing concept can be adapted to a simple lighting product. In FIG. 11 a diffuse light source 28 is surrounded by a cylinder 30 of the type shown in FIG. 8. Cylinder 30 is sufficiently long that light rays which pass directly from source 28 out the ends of cylinder 30 lie within the total internal reflection zone of the wall material forming prism light guide 32, without any need for further optical correction. The diameter of cylinder 30 is 32% of the diameter of prism light guide 32. Prism light guide 32 contains extraction mechanisms (not shown) to cause uniform escape of light over the length of guide 32. The ends of guide 32 are capped with mirrors (not shown) for capturing light which propagates all the way to the end of the guide, so that all the light is efficiently utilized.

Figure 12:
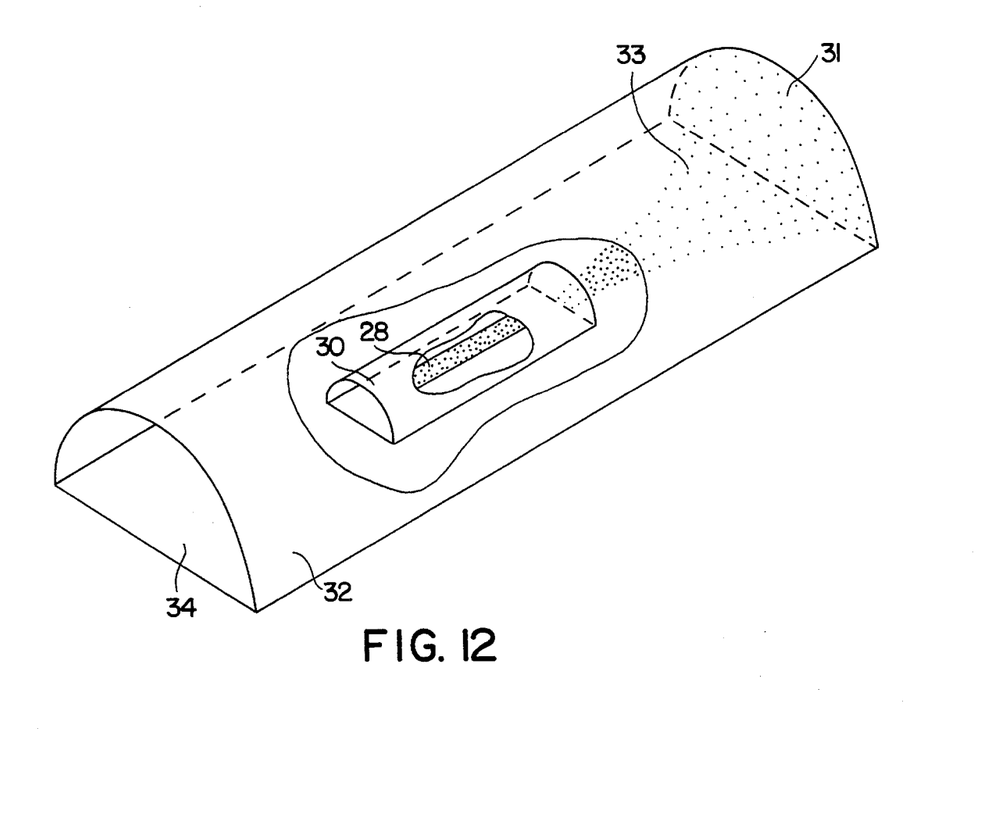
FIG. 12 is a partially fragmented pictorial illustration of a structure similar to that depicted in FIG. 11, but with light guide and cylindrical cover truncated.

The parameters which govern the coupling of diffuse light sources to prism light guides are much more general than the simple preceding example suggests. For example, neither cylinder 30 nor prism light guide 32 need be fully circular in cross-section. As shown in FIG. 12, they may be partly circular in cross-section, with the remainder truncated by a conventional metal reflector 34.

Figure 2:
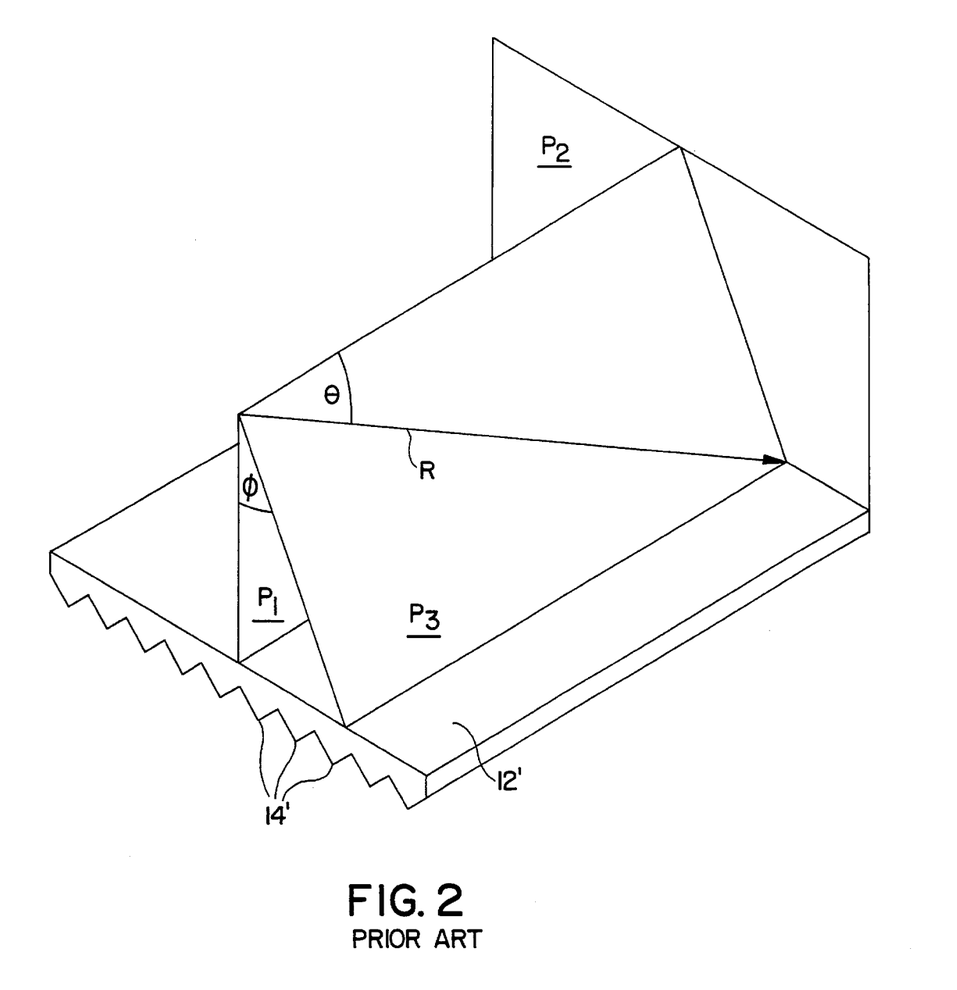
FIG. 2 is a greatly enlarged, pictorial illustration of a segment of prismatic light guide wall material intersected by two notional planes and an incident light ray which defines a third notional plane.

Furthermore, although the transparent dielectric material most commonly used to form the walls of a prism light guide has isosceles right triangle prisms of the type shown in FIGS. 2 and 5, the optical principles which characterize prism light guides are not restricted to simple isosceles right triangle prisms. In general, the prism light guide wall material need only have surfaces which are in "octature", that is:

1. all surfaces are parallel to an octature symmetry direction (such as the z direction in the example of FIGS. 1 and 2);
2. all inner surfaces extend at right angles to one another;
3. all outer surfaces extend at right angles to one another; and,
4. inner and outer surfaces extend at 45° to one another.

Figure 13:
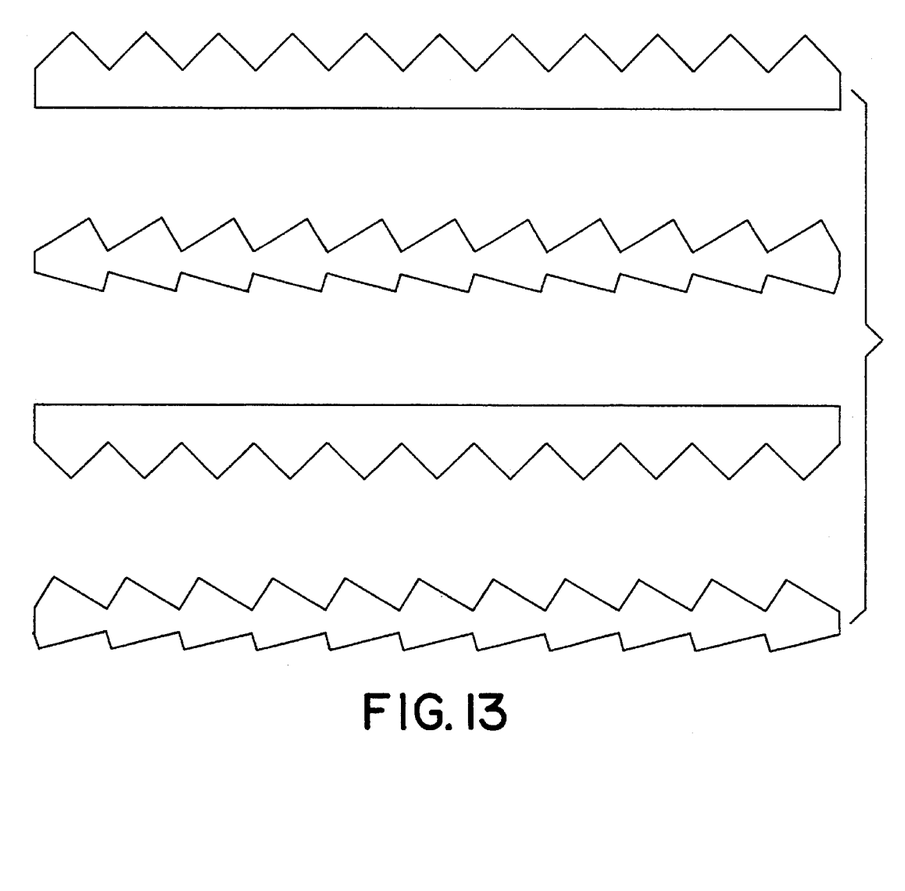
FIG. 13 is a cross-sectional elevation depicting four different prismatic structures which all satisfy the "octature" requirement characteristic of material suitable for forming a prism light guide.
Figure 14:
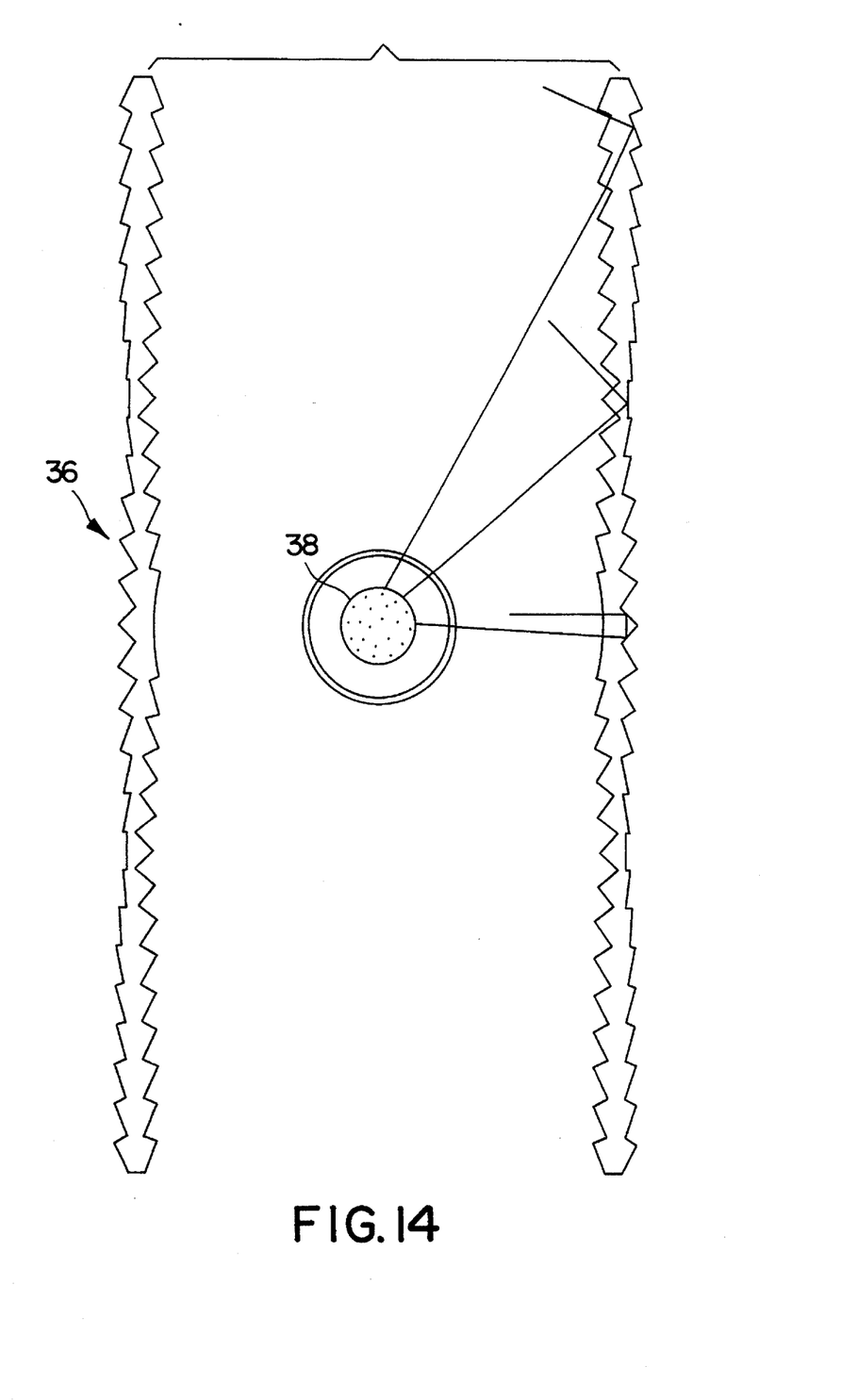
FIG. 14 is a cross-sectional elevation of a planar prism light guide conforming to the invention.

For example, FIG. 13 depicts four different prismatic cross-sections, all of which satisfy the octature requirement, all of which are suitable wall material for forming a prism light guide, and all of which have total internal reflection zones different than that shown in FIG. 7. By employing a structure which has octature throughout, but in which the prismatic shape varies as a function of position, it is possible to capture the geometrical concepts of the invention in cross-sections which are not circular. For example, FIG. 14 shows a planar prism light guide 36 having a diffuse light source 38 surrounded by a cylindrical cover of the type described above in relation to FIG. 8. The FIG. 14 structure achieves the same performance as the FIG. 11 structure because of the detailed shape of the prisms as shown.

A fully generalized characterization of the invention must take into account both the microscopic and macroscopic structure of prism light guide wall material. The following discussion presents a simplified method of describing the microscopic structure of prism light guide wall material at any given point in reference to simple well-defined macroscopic lines and directions. This facilitates characterization of the invention in general.

Figure 15A:
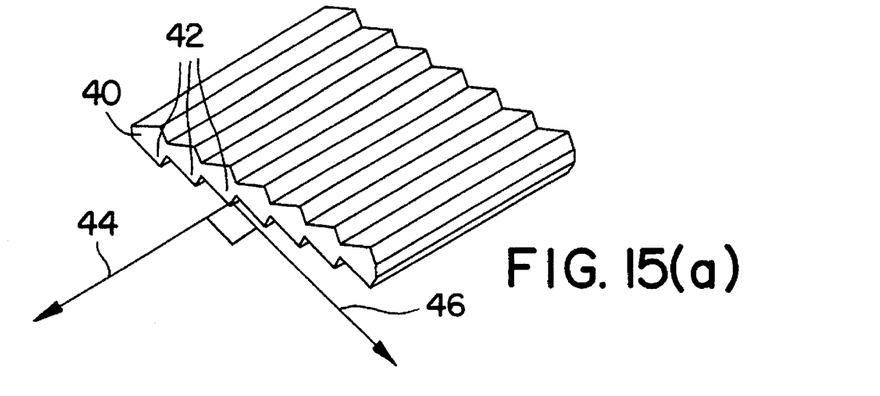
FIGS. 15(a), 15(b) and 15(c) depict three different shapes of prism light guide wall material, and the two vectors which characterize those shapes.
Figure 15B:
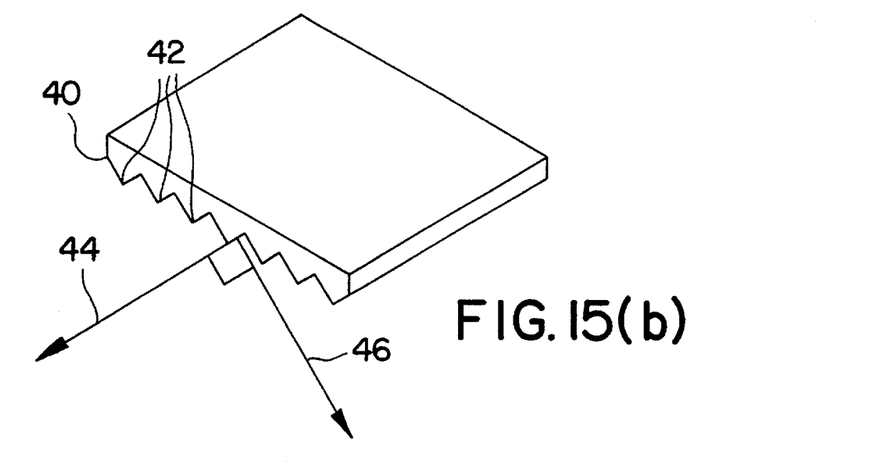
Figure 15C:
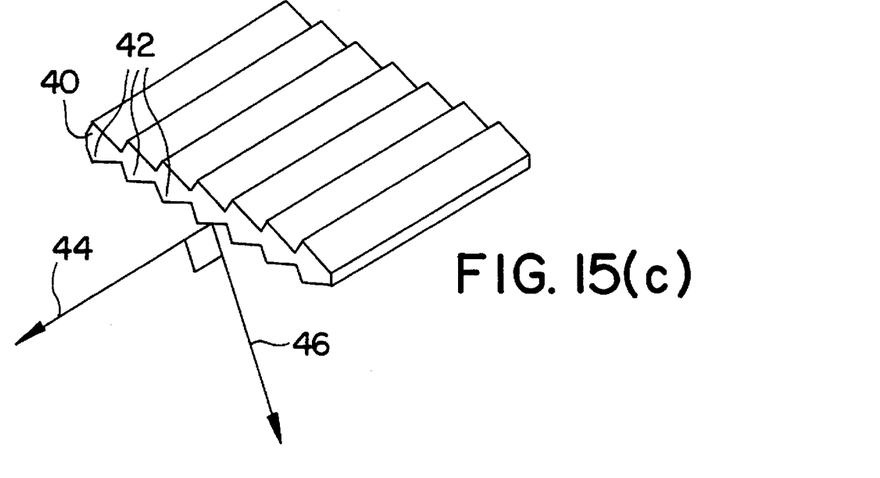

FIGS. 15(a), 15(b) and 15(c) each depict a small piece of prism light guide wall material 40 which is sufficiently large that it bears several complete prisms 42, but is sufficiently small that for all practical purposes the material is macroscopically flat and prisms 42 are uniform in shape over the extent of the piece. The shape of material 40 is characterized by just two vectors.

An "octature symmetry direction" vector 44 defines the direction of longitudinal extent of prisms 42. The octature symmetry direction must be parallel to the macroscopic surface of material 40, but otherwise can have any orientation. In the special case where material 40 forms a prism light guide, the octature symmetry direction must be parallel to the direction of longitudinal symmetry (i.e. the longitudinal axis) of the guide, but this is not necessary if material 40 serves another purpose, such as a cover of the type described above in relation to FIG. 8.

The second vector is a "prism surface normal direction" vector 46 which is either perpendicular to or parallel to the surface normal directions of prisms 42. From the above definition of the octature property, it follows that prismatic surfaces on the opposite side of the prism light guide wall material will be inclined at 45° to the directions just described. The prism surface normal directions must always be perpendicular to the octature symmetry direction but are otherwise unrestricted. FIGS. 15(a), 15(b) and 15(c) depict three different examples of directions and show the resultant effect on the macroscopic structure. As mentioned earlier, all such materials are prism light guide wall material, but the direction of the prism surface normal affects the range of light rays which undergo total internal reflection in the case of light rays which lie beyond the acceptance angle of prism light guide.

Figure 16:
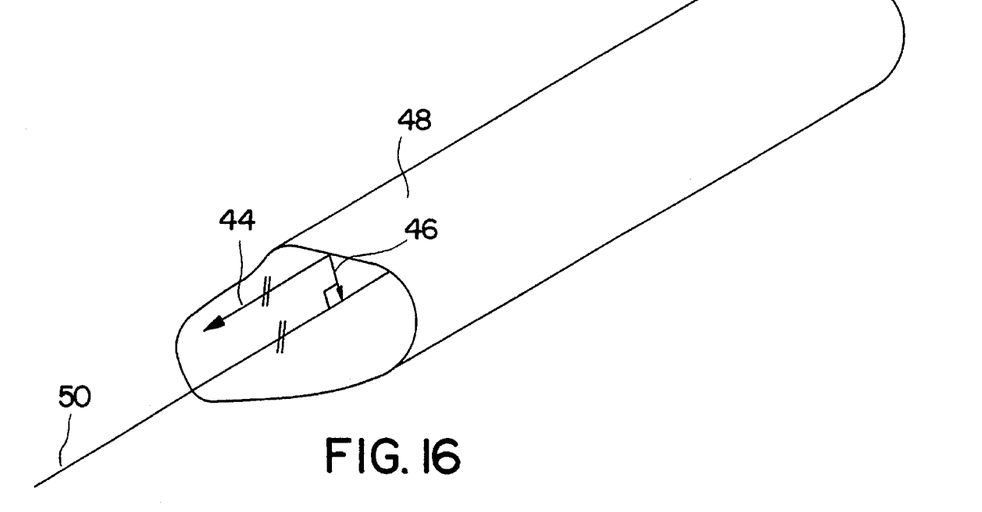
FIG. 16 depicts a generalized prism light guide.

FIG. 16 depicts a generalized shape for an outer prism light guide 48 (i.e. analogous to guide 32 of FIG. 11). The prisms are not drawn explicitly as they are too small to see in this illustration, but they are described below using the foregoing dual vector terminology. The cross-sectional shape of guide 48 is uniform in the plane perpendicular to a selected optical center line 50, but is arbitrary otherwise. The prisms on the prism light guide wall material forming guide 48 are characterized at any point as follows:

1. the material's octature symmetry direction 44 at such point is parallel to the optical center line 50 of guide 48; and, 2. the prism surface normal direction 46 of the material's prisms is defined by a line extending from such point through and perpendicular to optical center line 50.

If guide 48 is circular in cross-section, the foregoing definition yields a prism light guide like that shown in FIG. 1. For other shapes there will be prismatic surfaces on both the inside and the outside of the material.

Figure 17:
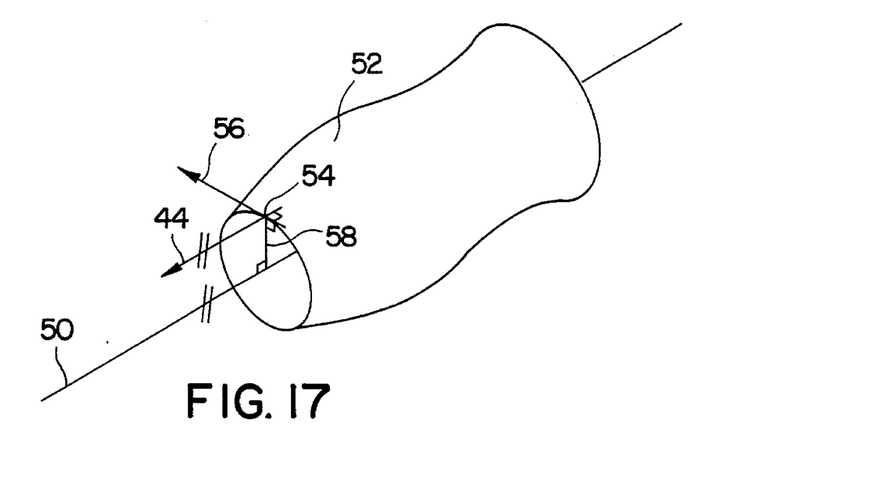
FIG. 17 depicts a generalized form of non-absorptive means for preventing light rays emitted by a diffuse light source from entering a non-total internal reflection zone.

FIG. 17 shows a generalized cover 52 positionable within generalized guide 48. Cover 52 is made of prism light guide wall material, but is not a prism light guide. The material comprising cover 52 defines a figure of revolution about the same optical center line 50 as seen in FIG. 16. Thus, cover 52 is circular in all cross-sections perpendicular to optical center line 50. The diameter of this circular cross-section need not be constant: as depicted in FIG. 17 the diameter may vary along optical center line 50, so that a wide variety of shapes are possible for cover 52. For example a spherical shell would fall within the restrictions described above. The simplest and most common example is that of a cylinder but other possibilities may be very advantageous in certain situations.

As previously mentioned, cover 52 is not a prism light guide. Unlike guide 48, the octature symmetry direction of the prism light guide material forming cover 52 is not constant throughout, but rather varies from position to position. At any point on cover 52, the relationship shown for exemplary point 54 (FIG. 17) holds true; namely, the octature symmetry direction 56 of cover 52 at point 54 is perpendicular to the first octature symmetry direction 44 of FIG. 16 and also is perpendicular to a line 58 drawn from point 54 through and perpendicular to optical center line 50. The other defining characteristic of the material forming cover 52 is that the outside prism surface normal reference is defined by line 58.

Figure 8:
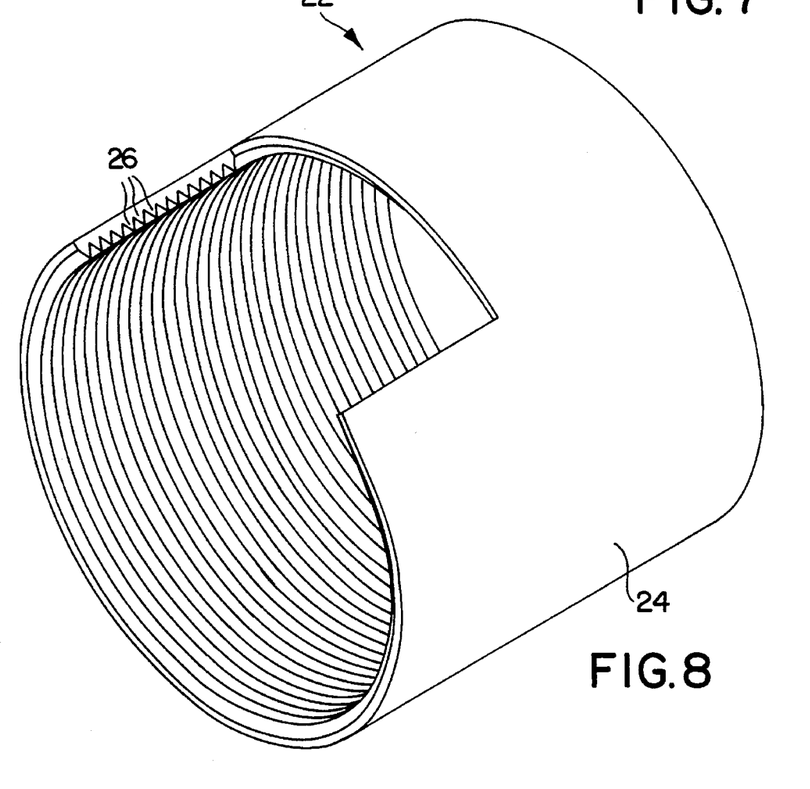
FIG. 8 is a partially fragmented pictorial illustration of a non-absorptive means for preventing light rays emitted by a diffuse light source from entering the non-total internal reflection (i.e. non-shaded) zone of FIG. 7.

If cover 52 is cylindrical, the above restrictions generate a prismatic structure such as that shown in FIG. 8 with prisms on one side only. But, in general, prismatic surfaces will be found on both the inside and the outside of the cover material.

The foregoing generalized geometrical characterization makes it possible to maintain the diffuse light guidance capability described in reference to the specific geometries of FIGS. 1 through 12, with substantially more design freedom. Exactly the same concepts apply; namely, insuring that the zone of possible light exitance from the cover always consists of ray directions which are incapable of being transmitted by the wall material of the prism light guide, so that they are guided. As with the specific examples described previously, it is necessary to ensure that the cover has a sufficiently small diameter that this guidance effect is achieved. Also, as with the specific examples described previously, this diameter will be substantially larger than that which would be possible for a diffuse light source not contained within the cover. Again, as before, the diffuse light source will be within the cover and positioned in such a way that any light rays escaping directly from the cover rather than through it will be at angles for which their light is substantially guided by the outer light guide.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A light guide containing a light source, said light guide comprising:

(a) an outer prism light guide formed of prism light guide wall material, having uniform shape in cross-sections perpendicular to a first octature symmetry direction, and having an optical centre line parallel to said first octature symmetry direction, wherein:

(i) surfaces of said light guide wall material are substantially in octature relative to said first octature symmetry direction;

(ii) a surface normal vector at any point on any internal surface of said material is either substantially parallel or substantially perpendicular to a first notional line extending from said point through and perpendicular to said optical centre line;

(b) a cover positioned within said guide, around said light source, in cylindrical symmetry about said optical centre line, to intercept a substantial portion of light emitted by said source, said cover being formed of prism light guide wall material wherein:

(i) surfaces of said cover wall material are substantially in octature at any point on said cover relative to a second, spatially variable octature symmetry direction, which, at said point, is:

(A) perpendicular to said first octature symmetry direction; and, (B) perpendicular to a second notional line extending from said point on said cover through and perpendicular to said optical centre line;

(ii) a surface normal vector at any point on any outer surface of said cover is either substantially parallel or substantially perpendicular to said first octature symmetry direction; and, (iii) said cover is confined to a region sufficiently close to said optical centre line to substantially prevent propagation of light rays incident on an inside surface of said cover to and through said light guide wall material.

2. A light guide as defined in claim 1, wherein said cover forms a cylinder.

3. A light guide as defined in claim 2, wherein:
   (a) said cylinder has a length "l" and a diameter "d";
   (b) said length "l" is less than said light guide length dimension; and,
   (c) each end of said cylinder extends more than 1.65 times said diameter "d" beyond said light source.

4. A light guide as defined in claim 1 or 2 or 3, wherein said light guide forms a cylinder.

5. A light guide as defined in claim 1 or 2 or 3, wherein said light guide and said cover form partial concentric cylinders truncated by a planar metallic reflector which intersects said optical centre line.

6. A light guide as defined in claim 1 or 2 or 3, wherein said prism light guide further comprises:
   (a) light extraction means for controllably emitting light at selected points along said guide; and,
   (b) end reflector means for preventing light emission through either opposed end of said guide.

* * * * *

UNITED STATES PATENT AND TRADEMARK OFFICE
CERTIFICATE OF CORRECTION

PATENT NO. : 5,481,637
DATED : January 2, 1996
INVENTOR(S) : Lorne A. Whitehead

It is certified that error appears in the above-indentified patent and that said Letters Patent is hereby corrected as shown below:

Column 3, immediately after line 58, insert:

$$\theta_c = \cos^{-1}\sqrt{1-(\eta^2-1)\left(\frac{2-\sqrt{2}}{2+\sqrt{2}}\right)} \qquad (1)$$

Column 4, immediately after line 59, insert:

$$x/y = \tan\phi \qquad (2)$$

$$z/y = \left(\frac{1}{\cos\phi\tan\theta}\right) \qquad (3)$$

Signed and Sealed this

Twenty-first Day of May, 1996

Attest:

BRUCE LEHMAN

*Attesting Officer*     *Commissioner of Patents and Trademarks*